(12) United States Patent
Luchesi De Almeida et al.

(10) Patent No.: US 10,576,402 B2
(45) Date of Patent: Mar. 3, 2020

(54) AIR FILTER

(71) Applicants: Mahle Metal Leve S/A, Jundiai-Sp (BR); Mahle International GmbH, Stuttgart (DE)

(72) Inventors: Alexandre Luchesi De Almeida, Campinas (BR); Edson Valdomiro De Azevedo, Jr., Jundiai (BR); Pedro Basso, Santo Andre (BR); Marcos Jose Dantas De Oliveira, Santo Andre (BR)

(73) Assignees: Mahle Metal Leve S/A (BR); Mahle International GmbH (DE)

( * ) Notice: Subject to any disclaimer, the term of this patent is extended or adjusted under 35 U.S.C. 154(b) by 0 days.

(21) Appl. No.: 16/332,788

(22) PCT Filed: Sep. 15, 2016

(86) PCT No.: PCT/EP2016/071878
§ 371 (c)(1),
(2) Date: Mar. 12, 2019

(87) PCT Pub. No.: WO2018/050231
PCT Pub. Date: Mar. 22, 2018

(65) Prior Publication Data
US 2019/0201826 A1   Jul. 4, 2019

(51) Int. Cl.
*B01D 46/48* (2006.01)
*B01D 46/00* (2006.01)
(Continued)

(52) U.S. Cl.
CPC ..... *B01D 46/0004* (2013.01); *B01D 46/2414* (2013.01); *B01D 46/4227* (2013.01); *B01D 46/4272* (2013.01); *B01D 46/48* (2013.01)

(58) Field of Classification Search
CPC ............ B01D 46/0004; B01D 46/2414; B01D 46/48; B01D 46/4272
(Continued)

(56) References Cited

U.S. PATENT DOCUMENTS

| | | |
|---|---|---|
| 4,217,118 A | 8/1980 | Kopf et al. |
| 5,893,937 A | 4/1999 | Moessinger |

(Continued)

FOREIGN PATENT DOCUMENTS

| | | |
|---|---|---|
| DE | 2756751 A1 | 6/1979 |
| DE | 202005009097 U1 | 10/2006 |
| DE | 102013014488 A1 | 3/2015 |

OTHER PUBLICATIONS

English abstract for DE-202005009097.
English abstract for DE-102013014488.

*Primary Examiner* — Minh Chau T Pham
(74) *Attorney, Agent, or Firm* — Fishman Stewart PLLC

(57) ABSTRACT

An air filter for a fresh air system of an internal combustion engine may include a filter housing including a housing lid and a filter element arranged exchangeably in the filter housing separating a raw side from a pure side. The filter element may include an annular filter body, a first end plate, and a second end plate. A dust collector space may be disposed in the filter housing on the raw side and may be delimited axially by the housing lid and the first end plate. The housing lid may have a step which may radially delimit the dust collector space. A connection may be disposed in a circumferential section of the dust collector space which is not bordered by the step. The step may have a radial aperture fluidically connecting the dust collector space to a discharge stub, the radial aperture arranged diametrically opposite the connection.

20 Claims, 7 Drawing Sheets

(51) Int. Cl.
*B01D 46/24* (2006.01)
*B01D 46/42* (2006.01)

(58) Field of Classification Search
USPC ...... 55/498, 502, 482, 504, 510, 521, 385.3; 123/198 E
See application file for complete search history.

(56) References Cited

U.S. PATENT DOCUMENTS

| | | | |
|---|---|---|---|
| 2011/0252964 A1* | 10/2011 | Wahlquist | B01D 46/0068 95/20 |
| 2013/0086877 A1* | 4/2013 | Kori | B01D 46/0024 55/482 |
| 2014/0033668 A1* | 2/2014 | Kleynen | B01D 29/21 55/502 |
| 2014/0223874 A1* | 8/2014 | Kaufmann | B01D 46/0004 55/510 |
| 2015/0167602 A1* | 6/2015 | Waltenberg | B01D 46/0004 55/501 |
| 2016/0115917 A1* | 4/2016 | Sorger | B01D 46/0005 55/481 |
| 2016/0144310 A1* | 5/2016 | Movia | B01D 46/0024 55/478 |
| 2018/0036746 A1* | 2/2018 | Antomon | B01D 46/00 |

\* cited by examiner

AIR FILTER

CROSS-REFERENCE TO RELATED APPLICATIONS

This application claims priority to International Patent Application No. PCT/EP2016/071878, filed on Sep. 15, 2016, the contents of which are hereby incorporated by reference in their entirety.

TECHNICAL FIELD

The present invention relates to an air filter or an air filter device for a fresh air system of an internal combustion engine.

BACKGROUND

A conventional air filter which can also be called an air filter device is known, for example, from DE 27 56 751 A1 and comprises a filter housing which has a housing pot, a housing lid, a raw air inlet and a pure air outlet. Furthermore, the air filter comprises a filter element which is arranged exchangeably in the filter housing and, therein, separates a raw side which is connected fluidically to the raw air inlet from a pure side which is connected fluidically to the pure air outlet. The filter element has an annular filter body made from filter material, a first end plate on a first axial end side of the filter body, and a second end plate on a second axial end side of the filter body. Furthermore, the known air filter is equipped with a dust collector chamber which is configured in the filter housing on the raw side. Here, the dust collector chamber is delimited axially on one side, on a side which faces away from the filter element, directly by the housing lid. In the case of the known air filter, the dust collector chamber is delimited axially on the other side, on a side which faces the air filter, by an intermediate floor which is separate with regard to the filter housing and the filter element and is arranged in the filter housing axially between the housing lid and the filter element. A dust collector chamber of this type makes it possible within the air filter to already receive contaminants upstream of the air filter, as a result of which the loading of the air filter is reduced. Air filters having a pre-separating means of this type are used, for example, in internal combustion engines of agricultural vehicles or of off-road vehicles, in order to avoid rapid loading or clogging of the filter element.

An air filter of the generic type is known from US 2016/0144310 A1 and additionally suggests to delimit the dust collector chamber axially directly by the first end plate of the filter element. Furthermore, the housing lid has, on its inner side, a step which radially delimits the dust collector space and borders the dust collector space in a C-shaped manner in the circumferential direction, wherein a connection is configured in a circumferential section of the dust collector space which is not bordered by the step, which connection is open radially toward the dust collector space and axially toward an annular space of the raw side which encloses the filter body in the circumferential direction. The known air filter is also provided with a discharge stub which is configured on the filter housing. Said discharge stub fluidically connects the dust collector space to a surrounding area of the air filter. At the known air filter said discharge stub is arranged in the connection of the step.

Other air filters are known from DE 20 2005 009 097 U1, U.S. Pat. No. 5,893,937 A, and DE 10 2013 014 488 A1.

SUMMARY

The present invention is concerned with the problem of specifying an improved embodiment for an air filter of the type mentioned at the outset and for an associated filter element, which embodiment is distinguished, in particular, by reduced manufacturing costs.

According to the invention, this problem is solved by way of the subject matter of the independent claim(s). Advantageous embodiments are the subject matter of the dependent claim(s).

The invention is based on the general concept of delimiting the dust collector chamber on a side which faces the filter element directly by the first end plate of the filter element, which end plate faces the housing lid. As a consequence, in the air filter according to the invention, the dust collector chamber is delimited axially on one side directly by the housing lid and axially on the other side directly by the first end plate. As a result of this proposal, a separate intermediate floor can be dispensed with, which reduces the manufacturing costs. At the same time, the assembly of the air filter is simplified.

According to one advantageous embodiment, the second end plate can be configured as an open end plate which has a central through opening. The first end plate is preferably configured as a closed end plate which accordingly does not have a central through opening. As a result of the configuration of the first end plate as a closed end plate, the dust collector chamber can extend substantially over the entire end face of the first end plate, as a result of which the dust collector chamber can be of comparatively large dimensions.

In another embodiment, the first end plate can have an annular region which covers the first axial end side of the filter body. Furthermore, the first end plate can have a core region which is bordered in the circumferential direction by the annular region. The first end plate is also configured as a closed end plate in this case. In said core region, a depression which projects axially in the direction of the second end plate can then be configured, which depression is open toward the dust collector space. The volume of the dust collector space can be increased significantly with the aid of said depression.

In one particularly advantageous development, a handle can then be arranged with the first end plate in the region of the depression. A handle of this type simplifies the handling of the filter element during assembly and dismantling of the filter element in the filter housing. An exchange of the filter element is accordingly simplified, for example. The handle can be formed integrally on the first end plate or can be configured separately therefrom and can be clipped thereto.

The invention provides that, on its inner side which faces the filter element, the housing lid has a step which radially delimits the dust collector space and which borders the dust collector space in a C-shaped manner in the circumferential direction. In other words, the step does not border the dust collector space completely in a closed manner in the circumferential direction, but rather a circumferential section of the dust collector space remains, which circumferential section is not bordered by the step. A fluidic connection is configured in said circumferential section of the dust collector space which is not bordered by the step, which fluidic connection is open radially toward the dust collector space and axially toward an annular space of the raw side, said annular space enclosing the filter body in the circumferential direction. Via said connection, the dust collector space communicates with the annular space which encloses the filter body on the raw side.

The invention provides that the first end plate is supported axially on the abovementioned step. In this way, firstly secure axial positioning of the filter element on the housing lid is achieved. Secondly, efficient closure of the dust collector space by way of the first end plate can be realized as a result.

A discharge stub is configured on the housing lid, which discharge stub is connected firstly fluidically to the dust collector space and secondly fluidically to a surrounding area of the air filter. In the case of corresponding pressure conditions in the filter housing, an air flow which is guided through the dust collector space can therefore exit through the discharge stub into the surrounding area. Here, said air flow can entrain contaminants which have collected in the dust collector space. In this way, the dust collector space can be automatically emptied again and again, as soon as the pressure conditions which are required for this purpose are set in the filter housing.

According to the invention the step has a radial aperture, expediently diametrically opposite the abovementioned connection, which radial aperture connects the dust collector space fluidically to the discharge stub. As a result, the flow guidance within the housing lid between the dust collector space and the discharge stub is simplified.

In another embodiment, said discharge stub can be configured on the housing lid, which discharge stub has a main connecting opening which is open toward the annular space of the raw side which borders the filter body in the circumferential direction, and an auxiliary connecting opening which is open toward the dust collector space. Here, in particular, the auxiliary connecting opening can be formed by the abovementioned radial aperture. The discharge stub which is open toward the surrounding area of the air filter therefore provides a fluidic connection firstly between the annular space and the surrounding area and secondly between the dust collector space and the surrounding area. In the case of corresponding flow and/or pressure conditions, a situation can be achieved as a result, for example, where contaminants can be discharged directly via the discharge stub out of the filter housing, bypassing the dust collector space.

According to one advantageous embodiment, the discharge stub can be configured as a suction jet pump. A suction jet pump of this type has a propellant inlet for feeding in a propellant, an operating medium inlet for sucking in an operating medium, and a mixture outlet for discharging a mixture comprising propellant and operating medium. In a known way, the throughflow of the suction jet pump with a propellant leads to a significant vacuum at the operating medium inlet, with the aid of which an operating medium can be sucked in and can be expelled together with the propellant at the mixture outlet. If the discharge stub is configured as a suction jet pump, the main connecting opening forms the propellant inlet, whereas the auxiliary connecting opening forms the operating medium inlet. An outlet opening of the discharge stub which is connected fluidically to the surrounding area then forms the mixture outlet. In the case of corresponding pressure conditions in the filter housing, a main stream flows on the raw side out of the annular space as a propellant stream from the main connecting opening through the outlet opening and in the process generates a vacuum at the auxiliary connecting opening, as a result of which an auxiliary flow through the dust collector space is produced which is likewise expelled through the outlet opening into the surrounding area. Here, the auxiliary flow entrains contaminants which are contained in the dust collector space.

The discharge stub which can also be called an output stub is equipped in preferred embodiments with a discharge or output valve which controls the outlet opening and opens and releases the outlet opening only at a predefined filling level of contaminants and/or only from a predefined raw-side positive pressure.

The raw air inlet can advantageously be configured on the housing pot, preferably on a pot wall, to be precise in such a way that, during operation of the air filter, fresh air enters tangentially into an annular space of the raw side, which annular space encloses the filter body in the circumferential direction. As a result of the tangential inflow, a rotational flow is produced in said annular space, which rotational flow brings about pre-separation of solid and/or liquid contaminants while still within the housing pot. At the same time, said flow which rotates in the annular space can transport said contaminants as far as the dust collector space which adjoins the annular space axially and is connected fluidically thereto, for example, via the abovementioned connection. Therefore, the contaminants which are already separated in the annular space can be conveyed into the dust collector space via the rotational flow and through the connection. Furthermore, said rotational flow in the annular space can generate a certain positive pressure in defined operating states, which positive pressure can be sufficient, for example, to generate an airflow through the possibly present discharge stub. The raw air inlet is expediently situated in a region of the pot wall of the housing pot, which region is distal with respect to the housing lid.

In another embodiment, the pure air outlet can be configured on a pot bottom of the housing pot which lies axially opposite the housing lid, to be precise in such a way that, during operation of the air filter, fresh air exits axially from an interior space of the filter element, which interior space is enclosed in the circumferential direction by the filter body. Accordingly, during operation of the air filter, the filter element is preferably flowed through radially from the outside toward the inside.

In another advantageous embodiment, a rotary position fixing means can be configured between the first end plate and the housing lid, which rotary position fixing means fixes a predetermined rotary position between the filter element and the filter housing. The functional reliability of the air filter is improved as a result.

According to one development, on the first end plate, the rotary position fixing means can have at least one radially outwardly protruding projection which lies axially on the step and which bears in the circumferential direction against a stop which is configured on the housing lid. As a result, moreover, the rotary position fixing means assists the axial positioning of the filter element in the filter housing.

In another embodiment the first end plate of the filter element can be provided with a handle. This handle simplifies manipulation of the filter element.

According to an improved embodiment this handle can be arranged in the region of the depression. The handle can extend along said depression at a certain axial distance. In particular, the handle bridges the depression. In other words, the handle forms a bridge connecting the rim encircling the depression. A worker can grip the handle by hand, wherein the depression provides enough space for the fingers of the hand.

According to a preferred embodiment the handle can be provided with a receptacle into which a dome is axially inserted, said dome being provided at the housing lid. This embodiment ensures that only the correct filter element can be used with this filter since the housing lid cannot be attached to the housing pot, when the handle doesn't show the receptacle.

A filter element according to the invention is characterized in that it can be inserted into the filter housing of the air filter in such a way that the first end plate of the filter element brings about a direct axial boundary of the dust collector chamber in the filter housing.

Further important features and advantages of the invention arise from the subclaims, from the drawings and from the associated description of the figures using the drawings.

It goes without saying that the features which are mentioned in the above text and are still to be explained in the following text can be used not only in the respectively specified combination, but rather also in other combinations or on their own, without departing from the scope of the present invention.

Preferred exemplary embodiments of the invention are shown in the drawings and will be explained in greater detail in the following description, identical designations relating to identical or similar or functionally identical components.

BRIEF DESCRIPTION OF THE DRAWINGS

In the drawings, in each case diagrammatically,

FIG. 3 shows a longitudinal section of the air filter in the region of the housing lid.

DETAILED DESCRIPTION

Figure 1:
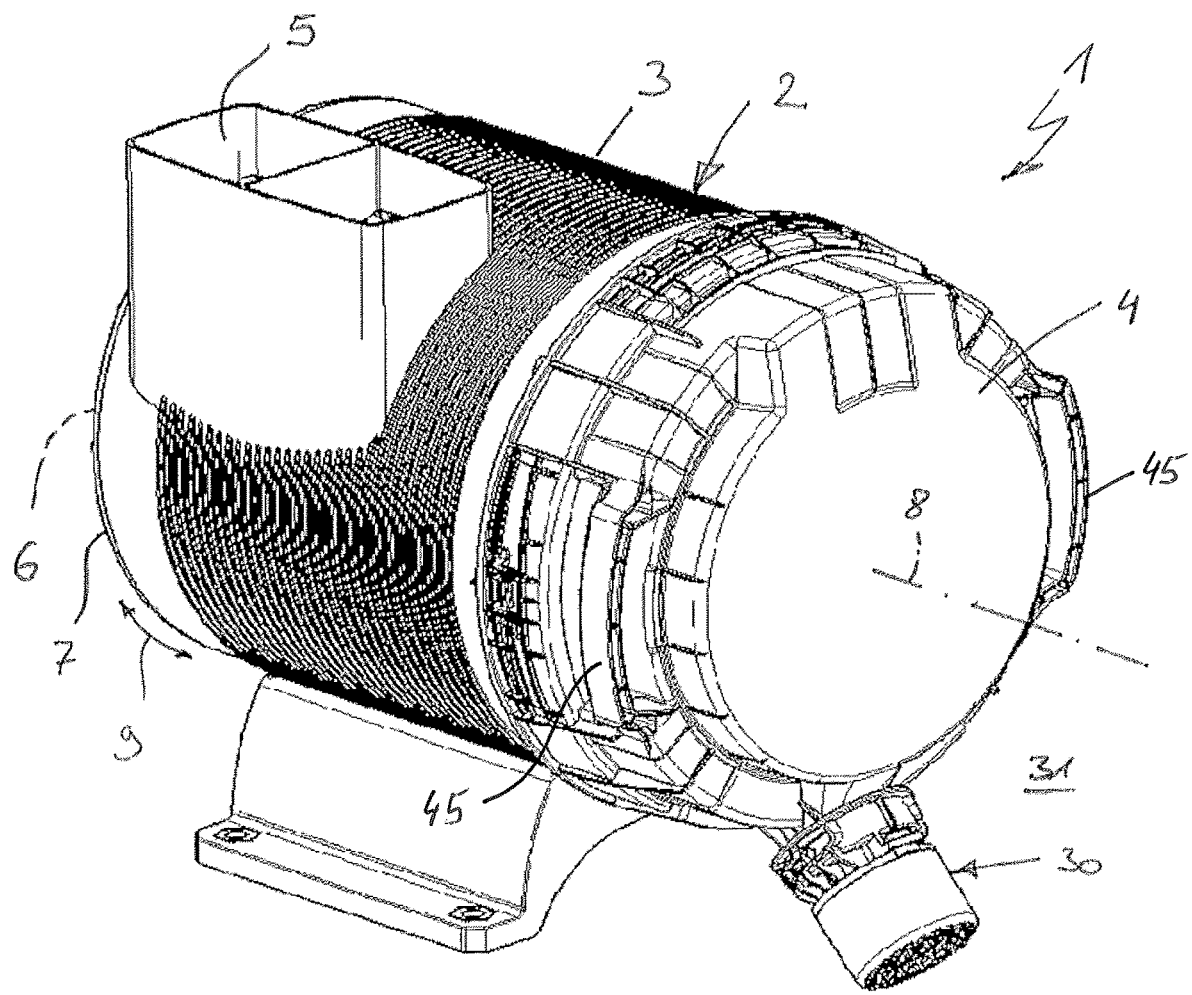
FIG. 1 shows an isometric view of an air filter.

According to FIG. 1, an air filter device 1 or an air filter 1 which is used, for example, in a fresh air system of an internal combustion engine for filtering fresh air comprises a filter housing 2 which has a housing pot 3, a housing lid 4, a raw air inlet 5 and a pure air outlet 6. In FIG. 1, the pure air outlet 6 is situated on a side of the filter housing 2 which faces away from the observer, namely on a pot bottom 7 of the housing pot 3 which lies axially opposite the housing lid 4. Here, the axial direction of the air filter 1 is defined by a longitudinal center axis 8 of the filter housing 2. The axial direction extends parallel to the longitudinal center axis 8. A radial direction lies perpendicularly with respect to the axial direction. A circumferential direction 9 rotates around the longitudinal center axis 8.

Figure 2:
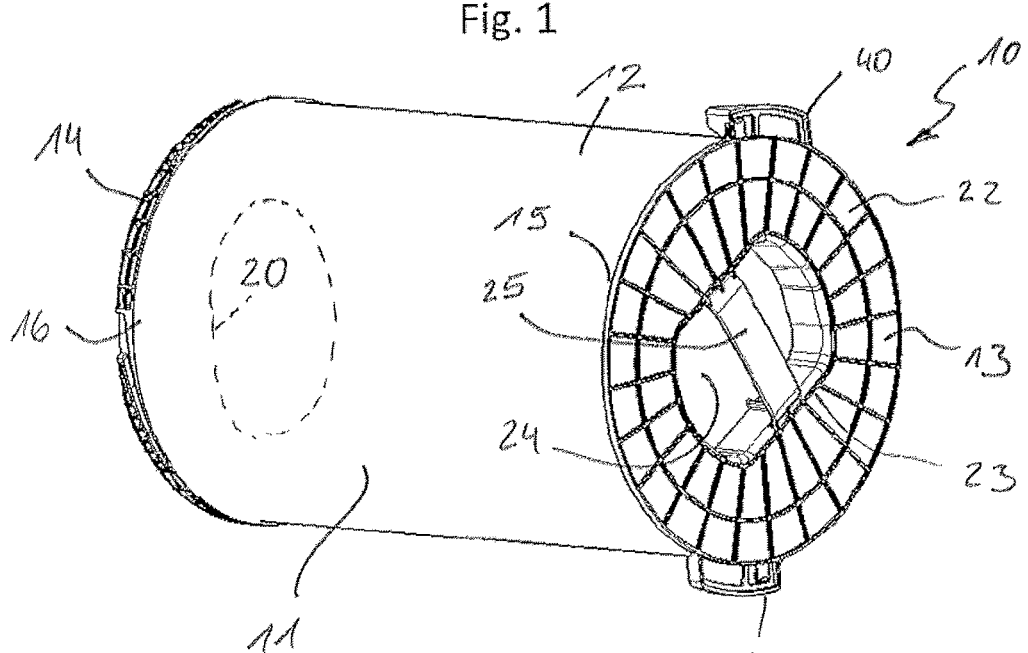
FIG. 2 shows an isometric view of a filter element of the air filter.

A filter element 10 which is shown in FIG. 2 is arranged in the filter housing 2, which filter element 10 has an annular filter body 11 made from a filter material 12, a first end plate 13 which faces the housing lid 4, and a second end plate 14 which faces the pot bottom 7. The filter material 12 can be, for example, a folded web material. The first end plate 13 is situated on a first axial end side 15 of the filter body 11. The second end plate 14 is situated on a second axial end side 16 of the filter body 11 which faces away axially from the first end side 15.

FIG. 3 shows the filter housing 2 in the region of the lid 4 in an illustration which is sectioned parallel to the axial direction, only the lid 4 of the filter housing 2 being shown, and only the first end plate 13 of the filter element 10 being shown, whereas the filter body 11 is indicated only with an interrupted line. In the filter housing 2, the filter body 10 separates a raw side 17 which is connected fluidically to the raw air inlet 5 from a pure side 18 which is connected fluidically to the pure air outlet 6. Furthermore, a dust collector chamber 19 is configured in the filter housing 2 on the raw side 17. The dust collector chamber 19 is delimited directly by the housing lid 4 axially on one side, namely on a side which faces away from the filter element 10. The dust collector chamber 19 is delimited directly by the first end plate 13 axially on the other side, namely on a side which faces the filter element 10. It can be seen that the first end plate 13 is configured as a closed end plate. Therefore, the entire axial end face of the first end plate 13 can be utilized for axial delimitation of the dust collector space 19. In contrast to this, the second end plate 14 is configured as an open end plate which has a central through opening 20 which is indicated in FIG. 2 by way of an interrupted line and is open toward an interior space 21 of the filter body 10 which is bordered by the annular filter body 10 in the circumferential direction 9.

Figure 4:
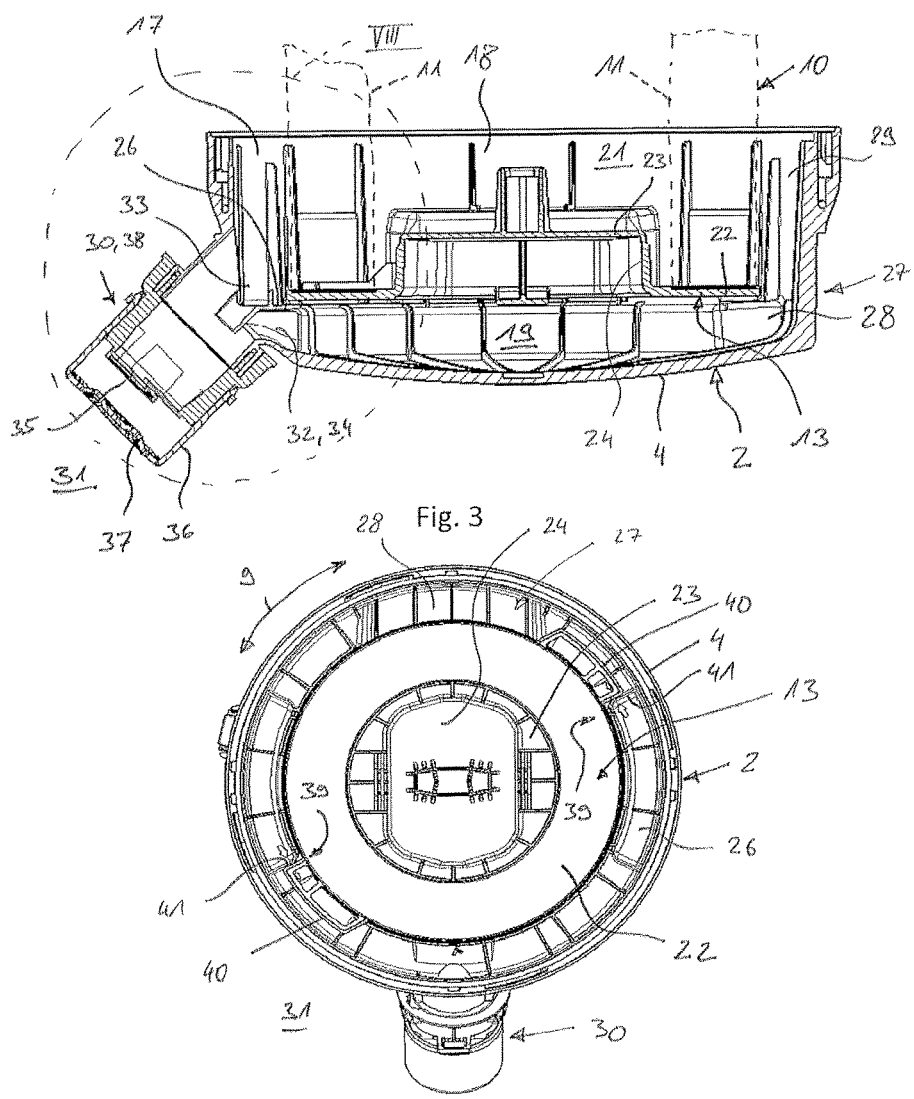
FIG. 4 shows an axial view of the housing lid with a filter element.

FIG. 4 shows the housing lid 4 and the first end plate 13. The housing pot 3 and the filter body 11 are not shown. Moreover, the first end plate 13 is omitted in the views of FIGS. 5 and 6.

According to FIGS. 2 and 3, the first end plate 13 has an annular region 22 which covers the first axial end side 15 of the annular filter body 11. Furthermore, the first end plate 13 has a core region 23 which is bordered in the circumferential direction 9 by the annular region 22. In said core region 23, the first end plate 13 has a depression 24 which projects axially in the direction of the second end plate 14. The depression 24 is open toward the dust collector space 19 and increases the volume of the dust collector space 19 as a result. The configuration of the first end plate 13 can be gathered from FIG. 2. Moreover, it can be gathered from FIG. 2 that a handle 25 can optionally be configured on the first end plate 13, with the aid of which handle 25 the filter element 10 can be manipulated simply. Here, the handle 25 is arranged in the region of the depression 24. The handle 25 is preferably formed integrally on the first end plate 13.

Figure 5:
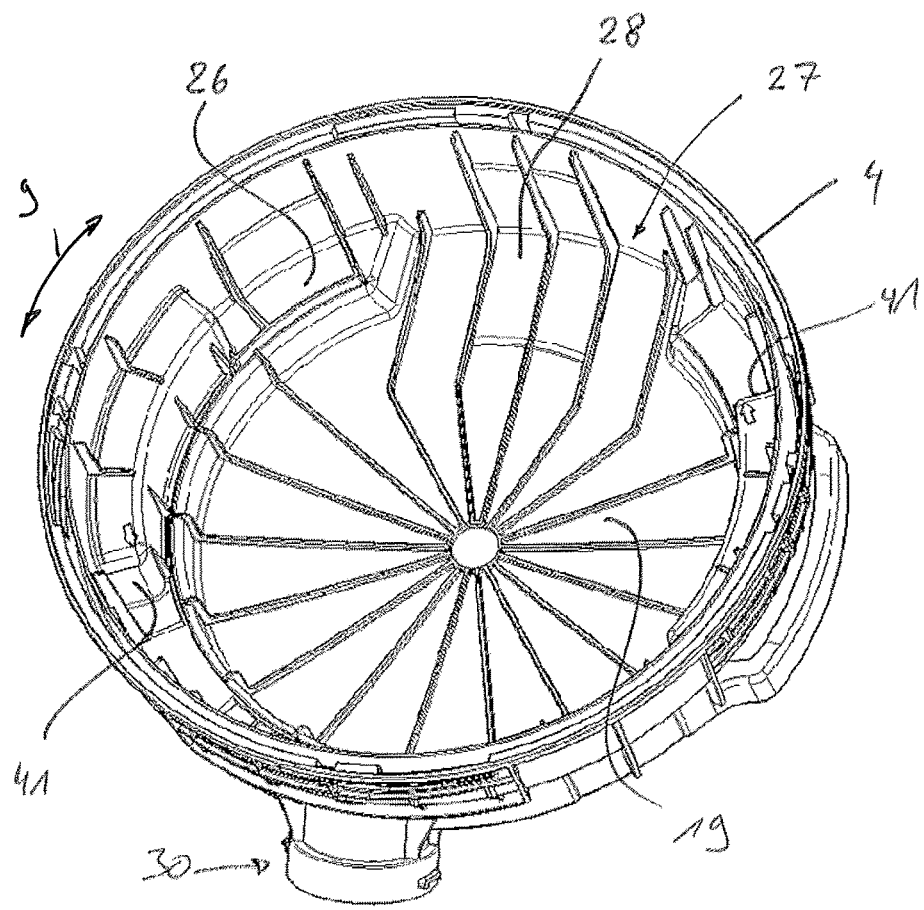
FIGS. 5 and 6 show isometric views of the housing lid from different viewing directions.
Figure 6:
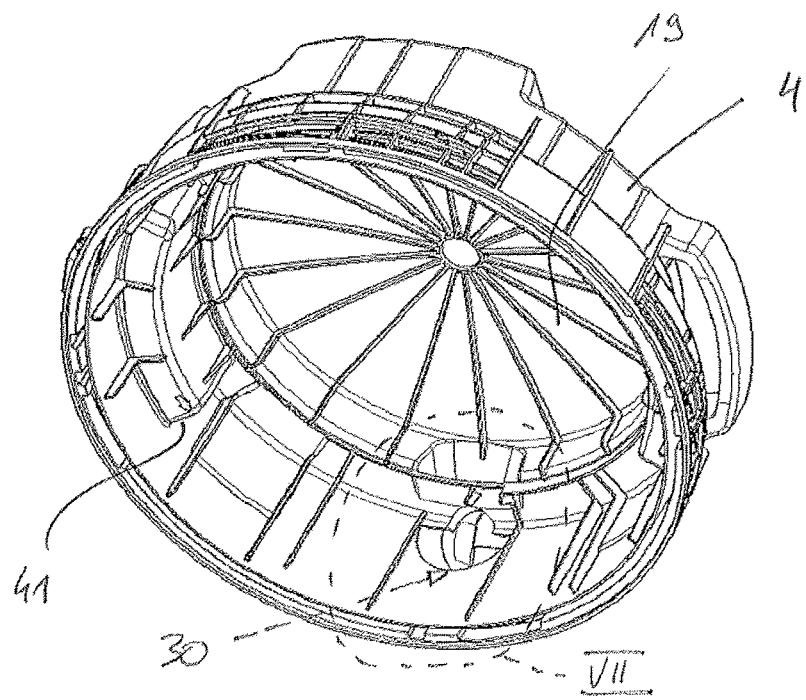
Figure 7:
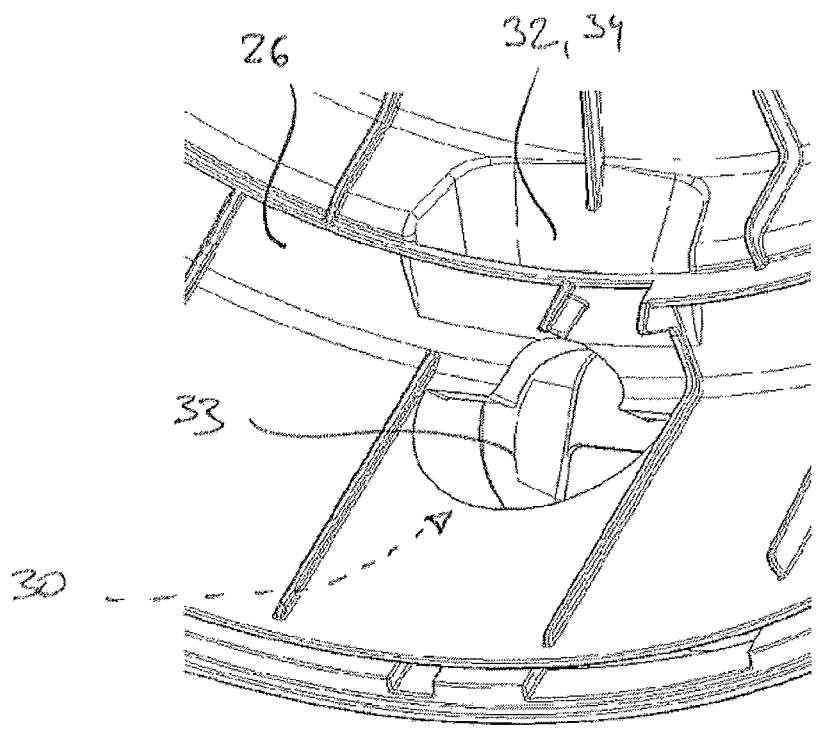
FIG. 7 shows an enlarged detail VII from FIG. 6.
Figure 8:
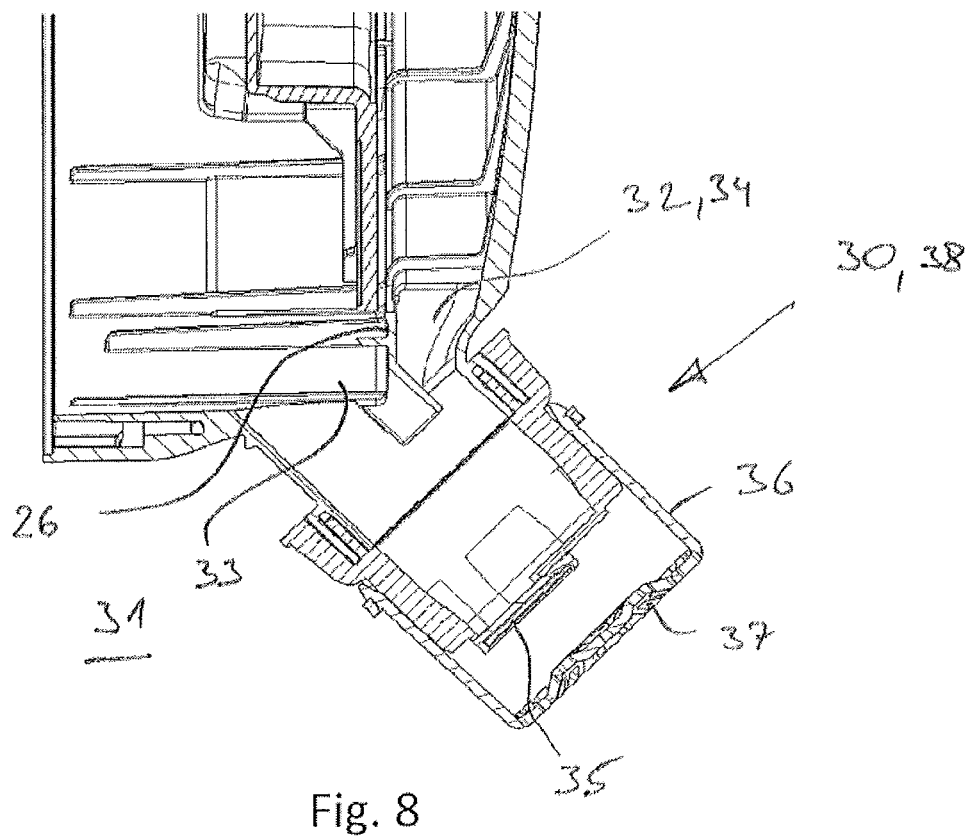
FIG. 8 shows an enlarged detail VIII from FIG. 3.

According to FIGS. 5 and 6, the housing lid 4 can have a step 26 on its inner side which faces the filter element 10, which step 26 delimits the dust collector space 19 radially. Here, the step 26 does not form an annularly closed border for the dust collector space 19, but rather only a C-shaped border. A connection 28 is configured in a circumferential section 27 of the dust collector space 19 which is not bordered by the step 26. Said connection 28 is open radially toward the dust collector space 19, whereas it is open axially toward an annular space 29 which can be seen in FIG. 3, forms a constituent part of the raw side 17, and encloses the filter body 10 in the circumferential direction 9. In the installed state of the filter element 10, the first end plate 13 is supported axially on said step 26, which can be seen in FIGS. 3 and 4.

In the air filter 1 which is shown here, moreover, a discharge stub 30 is configured on the filter housing 2, which discharge stub 30 is connected fluidically to the dust collector space 19, and which discharge stub 30, moreover, is connected fluidically to a surrounding area 31 of the air filter 1. The discharge stub 30 is expediently configured on the housing lid 4. According to FIGS. 3 and 6 to 8, the abovementioned step 26 has a radial aperture 32 which connects the dust collector space 19 fluidically to the discharge stub 30. Here, the aperture 32 is expediently arranged diametrically opposite the abovementioned connection 28. As can be gathered, in particular, from FIGS. 3 to 8, the discharge stub 30 can have a main connecting opening 33, an auxiliary connecting opening 34 and, moreover, an outlet opening 35. The main connecting opening 33 is open toward the annular space 29. The auxiliary connecting opening 34 is open toward the dust collector space 19 and is formed here by the aperture 32. Finally, the outlet opening 35 is open toward the surrounding area 31. In the examples which are shown here, moreover, a cover 36 is plugged onto the discharge stub 30, which cover 36 can act as a diffuser and has a perforated bottom 37. Here, the discharge opening 35 is controlled by means of a flap which is not denoted in greater detail. Said flap forms a discharge valve which is integrated into the discharge stub 30 in order to control the outlet opening 35.

One embodiment is particularly advantageous, in which the discharge stub 30 is configured as a suction jet pump 38. A suction jet pump 38 of this type has a propellant inlet which is formed here by the main connecting opening 33, an operating medium inlet which is formed here by the auxiliary connecting opening 34 or by the aperture 32, and a mixture outlet which is formed here by the outlet opening 35.

According to FIG. 1, the raw air inlet 5 is configured on the housing pot 3 in such a way that, during operation of the air filter 1, fresh air enters tangentially into the annular space 29. To this end, the raw air inlet 5 tangentially adjoins a cylindrical pot wall of the housing pot 3, to be precise proximally with respect to the pot bottom 7. During operation, a rotational flow can therefore be formed in the annular space 29, which rotational flow can bring about a certain pressure increase in the annular space 29, in particular in conjunction with certain operating states of the internal combustion engine. A pressure increase of this type can be set, for example, in transient operating states of the internal combustion engine, for example if the internal combustion engine is throttled from full load to part load. As soon as a relative positive pressure is produced in the annular space 29, a main flow can flow out from the annular space 29 through the main connecting opening 33 and through the discharge stub 30 into the surrounding area 31. Here, an auxiliary flow is generated at the same time by way of the suction action of the suction jet pump 38, which auxiliary flow enters from the annular space 29 through the connection 28 into the dust collector space 19 and exits through the auxiliary connecting opening 34 or the aperture 32 and through the discharge stub 30 into the surrounding area 31. Here, the auxiliary flow can entrain contaminants which are collected in the dust collector space 19 and can expel them into the surrounding area 31. At the same time, the main flow can entrain contaminants which are collected in the annular space 29 and can expel them into the surrounding area 31.

During normal operation of the air filter 1, contaminants which are separated from the fresh air flow on account of the rotational flow while still within the annular space 29 can be conveyed on the one hand as far as the connection 28, from where they pass into the dust collector space 19 and collect therein, and on the other hand as far as the main connecting opening 33, from where they pass into the discharge stub 30 and collect therein or discharge into the surrounding area 31 through the discharge stub 30. For an improved separation of the contaminants within the annular space 29 an additional inner cylindrical wall (not shown) can be provided which extends in the area of the first end plate 13 coaxially to the filter element 10 and limits the annular space 29 at a radial inner side.

According to FIG. 4, a rotary position fixing means 39 can be configured between the first end plate 13 and the housing lid 4, with the aid of which rotary position fixing means 39 a predefined rotary position can be fixed between the filter element 10 and the filter housing 2. According to FIGS. 2 and 4, said rotary position fixing means 39 has at least one radially outwardly protruding projection 40 on the first end plate 13. In the example which is shown here, two projections 40 of this type are provided which lie diametrically opposite one another. It is clear that more than two projections 40 of this type can also be provided. The rotary position fixing means 39 has a stop 41 on the housing lid 4 for the respective projection 40. Accordingly, two stops 41 of this type are provided in the example which is shown here, which stops 41 lie diametrically opposite one another. In the assembled state of the filter element 10 and the housing lid 4, the respective projection 40 lies axially on the step 26 and bears against the associated stop 41 in the circumferential direction 9.

Figure 9:
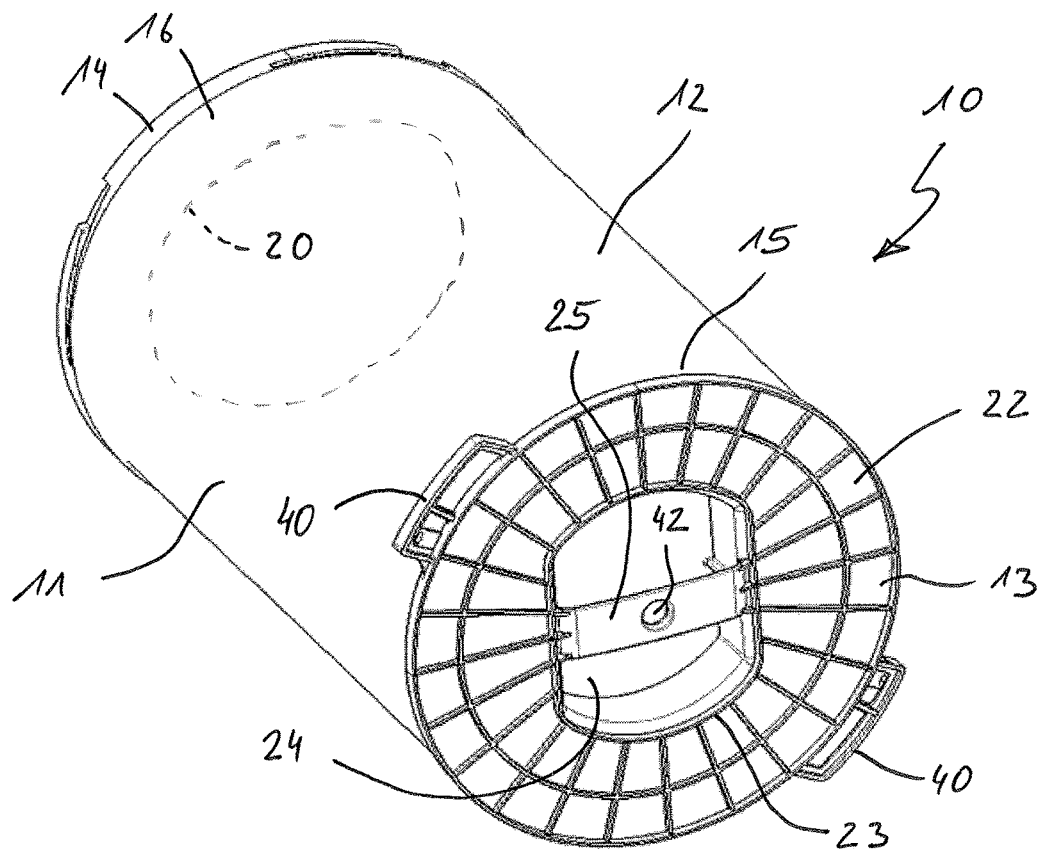
FIG. 9 shows an isometric view of the filter element of another embodiment.
Figure 10:
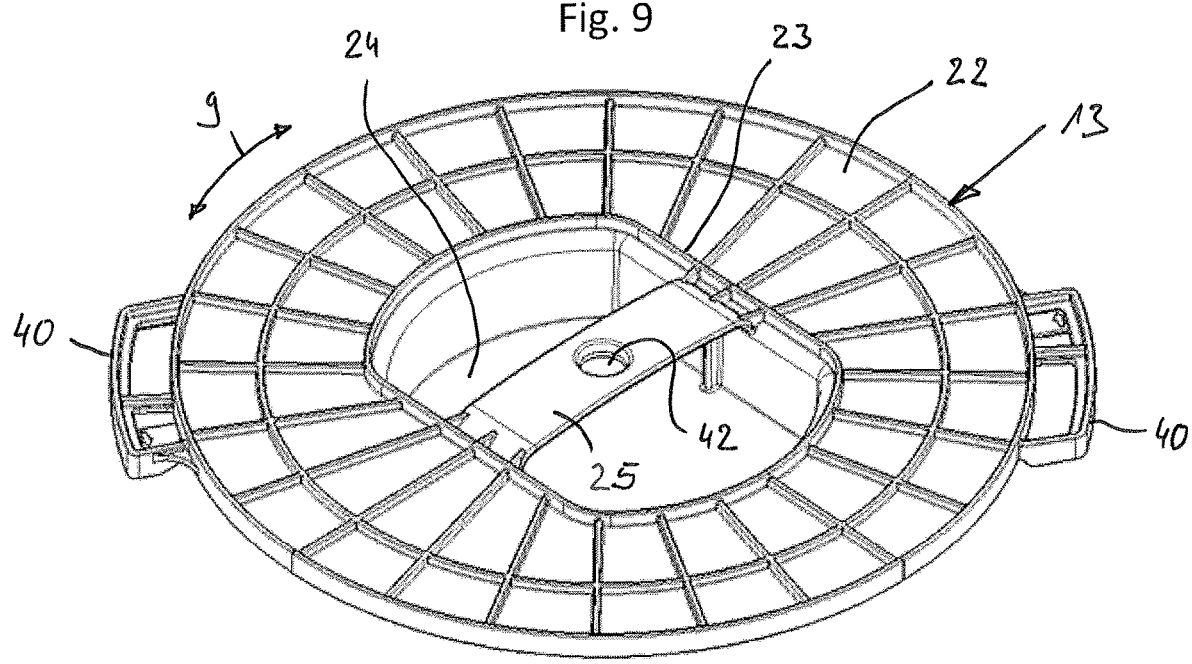
FIG. 10 shows an enlarged isometric view of a first end plate of the filter element from FIG. 9.

FIG. 9 shows another embodiment of the filter element 10 which differs from the one depicted in FIG. 2 by the fact that the handle 25 is provided with a receptacle 42. As can be seen in FIGS. 9 and 10 this receptacle 42 is placed in the center of the first end plate 13. In the mounted state, when the filter element 10 is inserted into the filter housing 2, the receptacle 42 is arranged coaxially to the longitudinal center axis 8 of the filter housing 2. In the depicted embodiment, the receptacle 42 is formed by an opening passing through the handle 25.

Figure 11:
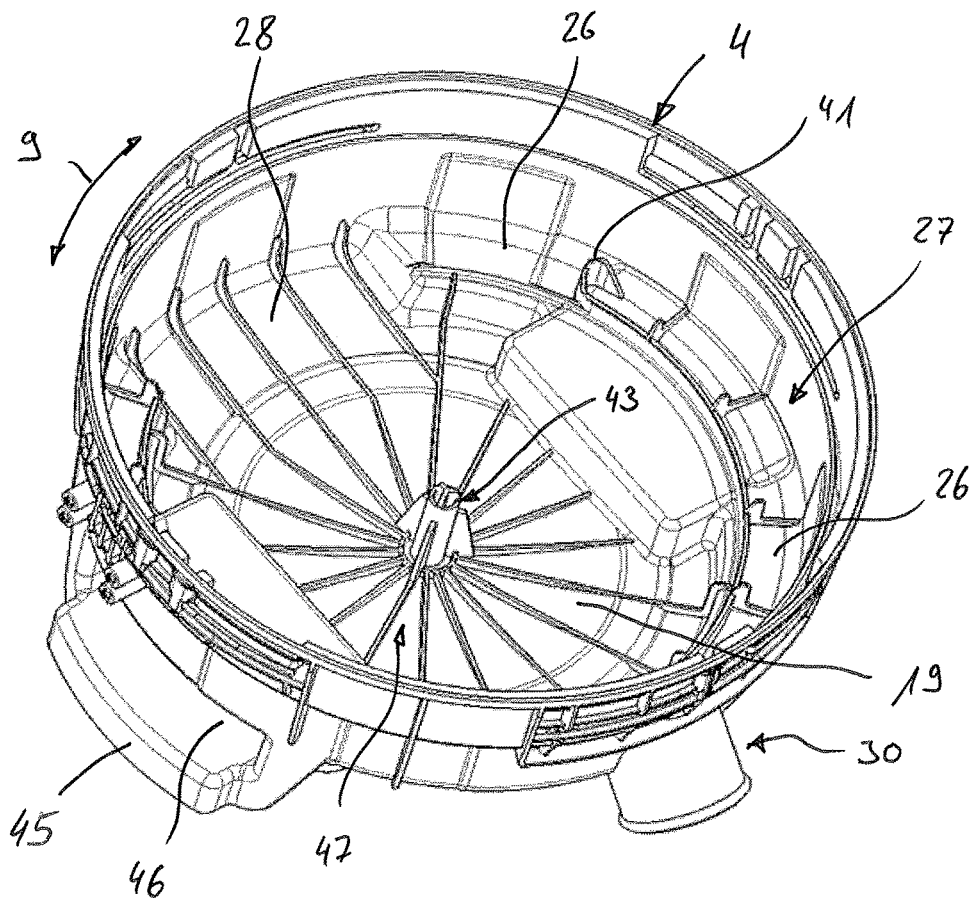
FIG. 11 shows an isometric view of the housing lid adapted to the filter element from FIG. 9.
Figure 12:
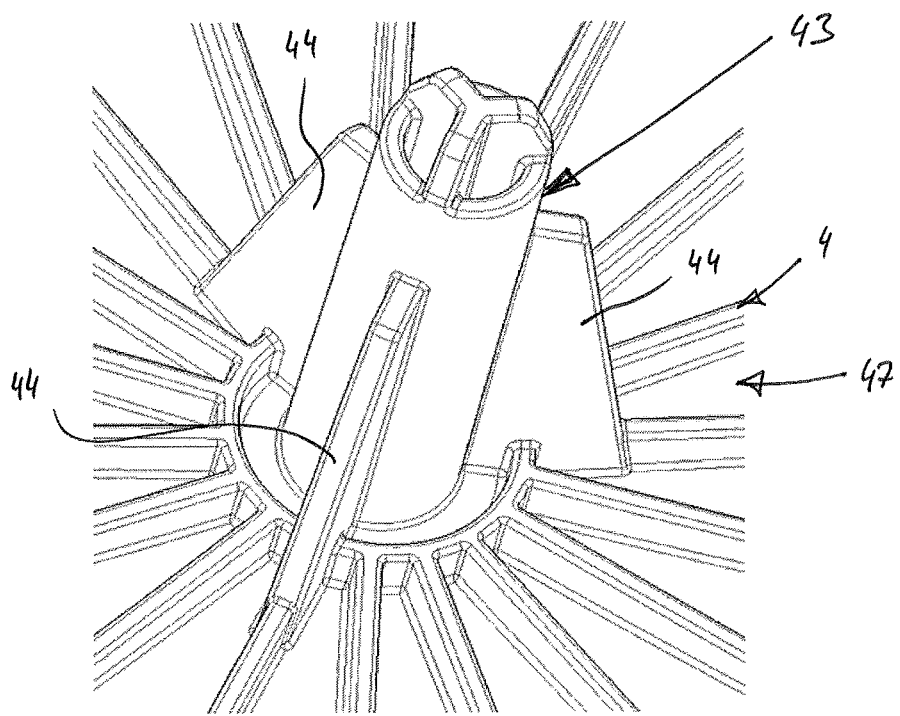
FIG. 12 shows an enlarged view of a center portion of the housing lid from FIG. 11.
Figure 13:
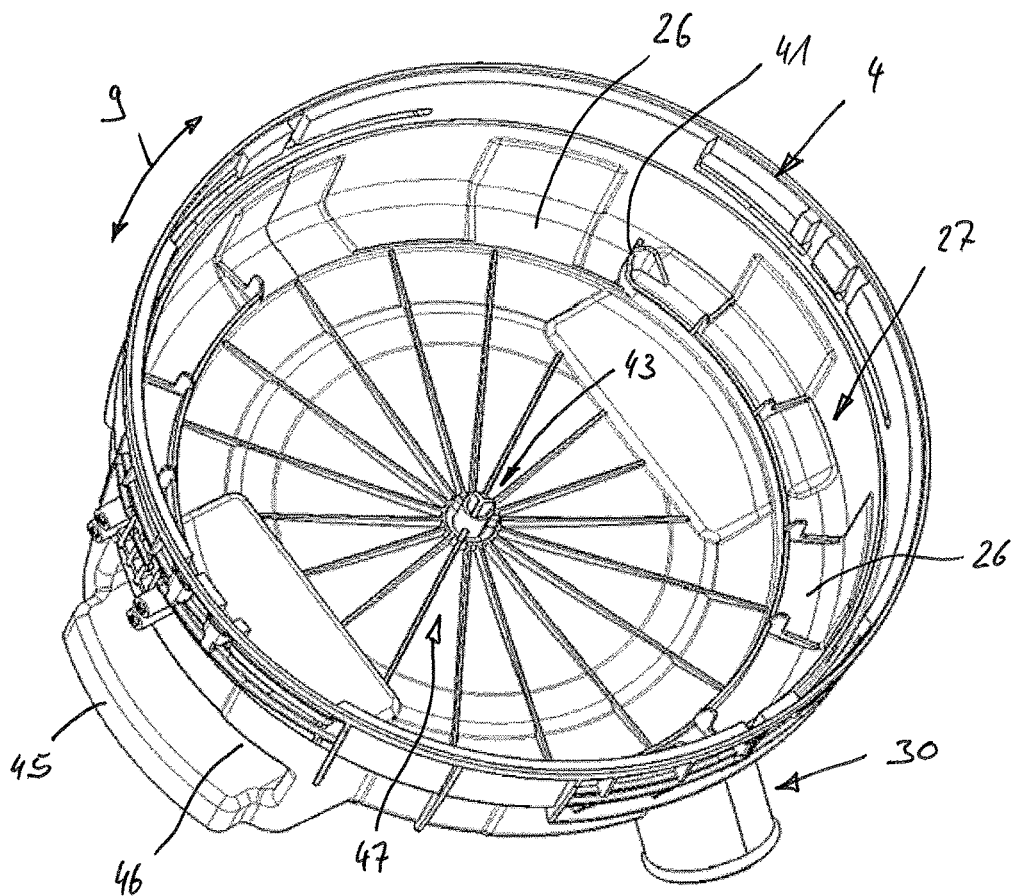
FIG. 13 shows an isometric view of another housing lid adapted to the filter element from FIG. 9 but of another embodiment of the filter housing.
Figure 14:
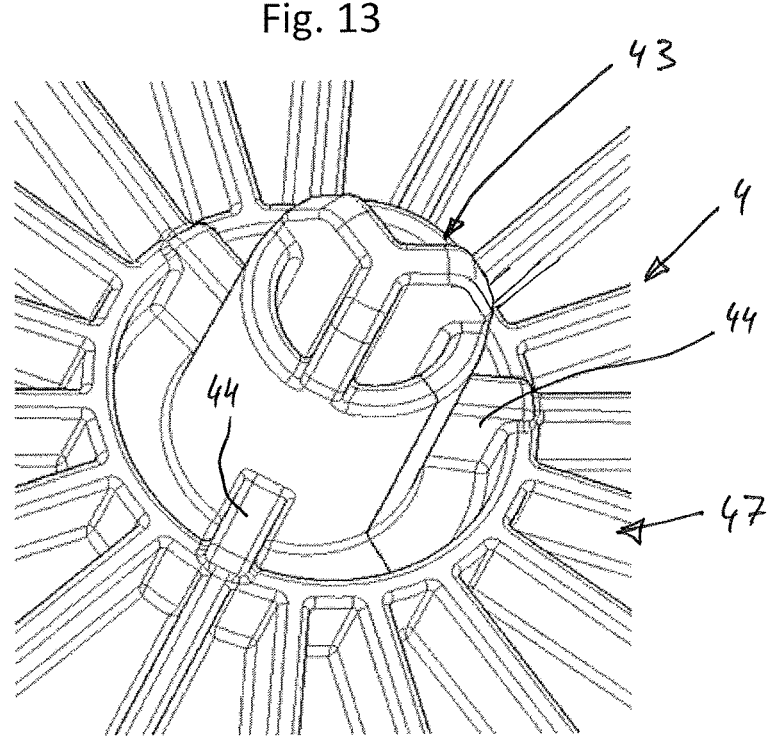
FIG. 14 shows an enlarged view of a center portion of the housing lid from FIG. 13.

FIGS. 11 to 14 show embodiments of the housing lid 4 which are adapted to the filter element 10 of FIG. 9 and to the first end plate 13 of FIG. 10, respectively. FIGS. 12 and 14 show an enlarged center portion 47 of the housing lid 4. This housing lid 4 is provided at its inner side with a dome 43, said inner side of the housing lid 4 facing the pot bottom 7 when the housing lid 4 is attached to the housing pot 3. This dome 43 is adapted to fit, i.e. to extend axially into the receptacle 42 when the housing lid 4 is attached to the housing pot 3 after the filter element 10 has been inserted into the housing pot 3. To this end, the dome 43 is arranged in the center of the housing lid 4, i.e. coaxially to the longitudinal center axis 8. In these special embodiments the dome 43 is of cylindrical shape and is stabilized by means of several fins 44 supported at an area of the housing lid 4 surrounding the dome 43.

The embodiment of FIGS. 11 and 12 differs from the embodiment of FIGS. 13 and 14 by the fact that in the embodiment of FIGS. 13 and 14 the dust collector chamber 19 is missing. Therefore, also the connection 28 is missing, and the step 26 is not interrupted in the circumferential direction 9 by the connection 28. Furthermore, the axial height of the housing lid 4 of FIG. 13 is smaller than the axial height of the housing lid 4 of FIG. 11. Consequently, also the axial extension of the dome 43 of FIGS. 13 and 14 is smaller than the axial extension of the dome 43 of FIGS. 11 and 12. Since dust collector chamber 19 is missing the discharge stub 30 of the embodiment of FIGS. 13 and 14 has only a single connecting opening which is open to the annular space 27.

In all depicted embodiments, the housing lid 4 is also provided with lid handles 45 for manipulating the housing lid 4. These lid handles 45 can be gripped by hand and allow the introduction of torque into the housing lid 4. For a better grip the lid handles 45 of the embodiments depicted in FIGS. 11 and 13 can be provided with handle openings 46 which allow the insertion of fingers of the hand gripping the respective lid handle 45.

The invention claimed is:

1. An air filter for a fresh air system of an internal combustion engine, comprising:
   a filter housing including a housing pot, a housing lid, a raw air inlet, and a pure air outlet;
   a filter element arranged exchangeably in the filter housing and, therein, separating a raw side which is connected fluidically to the raw air inlet from a pure side which is connected fluidically to the pure air outlet;
   the filter element including an annular filter body composed of a filter material, a first end plate disposed on a first axial end side of the filter body, and a second end plate disposed on a second axial end side of the filter body;
   a dust collector space disposed in the filter housing on the raw side;
   the dust collector space delimited axially on one side directly by the housing lid;
   the dust collector space delimited axially on an other side directly by the first end plate;
   the housing lid having, on an inner side, a step which radially delimits the dust collector space and borders the dust collector space in a C-shaped manner in a circumferential direction;
   a connection disposed in a circumferential section of the dust collector space which is not bordered by the step, the connection open radially toward the dust collector space and axially toward an annular space of the raw side which encloses the filter body in the circumferential direction;
   a discharge stub arranged on the filter housing fluidically connecting the dust collector space to a surrounding area of the air filter;
   wherein the step has a radial aperture fluidically connecting the dust collector space to the discharge stub, the radial aperture arranged diametrically opposite the connection.

2. The air filter as claimed in claim 1, wherein the first end plate is supported axially on the step.

3. The air filter as claimed in claim 2, wherein, via the first end plate supported axially on the step, the axial position of the filter element on the housing lid is secured and the dust collector space is closed via the first end plate.

4. The air filter as claimed in claim 1, wherein:
   the second end plate is configured as an open end plate including a central through opening; and
   the first end plate is configured as a closed end plate.

5. The air filter as claimed in claim 1, wherein:
   the first end plate has an annular region which covers the first axial end side of the filter body; and
   the first end plate has a core region bordered in the circumferential direction by the annular region, the core region including a depression projecting axially in a direction of the second end plate and opening toward the dust collector space.

6. The air filter as claimed in claim 1, wherein the discharge stub includes a main connecting opening which opens toward the annular space, and an auxiliary connecting opening which opens toward the dust collector space.

7. The air filter as claimed in claim 6, wherein the auxiliary connecting opening is defined by the radial aperture of the step.

8. The air filter as claimed in claim 6, wherein:
   the discharge stub is configured as a suction jet pump including a propellant inlet, an operating medium inlet, and a mixture outlet;
   the main connecting opening defines the propellant inlet;
   the auxiliary connecting opening defines the operating medium inlet; and
   the mixture outlet is defined by an outlet opening of the discharge stub connected fluidically to the surrounding area.

9. The air filter as claimed in claim 1, wherein the raw air inlet is disposed on the housing pot distally with respect to the housing lid such that, during operation of the air filter, fresh air enters tangentially into the annular space.

10. The air filter as claimed in claim 1, wherein the pure air outlet is arranged on a pot bottom of the housing pot disposed axially opposite the housing lid such that, during operation of the air filter, fresh air exits axially through the pure air outlet from an interior space of the filter element, the interior space enclosed in the circumferential direction by the filter body.

11. The air filter as claimed in claim 1, further comprising a rotary position fixing mechanism disposed between the first end plate and the housing lid, the rotary position fixing mechanism fixing a predetermined rotary position between the filter element and the filter housing.

12. The air filter as claimed in claim 11, wherein, on the first end plate, the rotary position fixing mechanism includes at least one radially outward protruding projection lying axially on the step and bearing in the circumferential direction against a stop disposed on the housing lid.

13. The air filter as claimed in claim 1, wherein the first end plate includes a handle.

14. The air filter as claimed in claim 5, wherein the first end plate includes a handle arranged in a region of the depression.

15. The air filter as claimed in claim 13, wherein the handle includes a receptacle into which a dome is axially inserted and arranged, the dome arranged on the housing lid.

16. An air filter for a fresh air system of an internal combustion engine, comprising:
   a filter housing including a housing pot, a housing lid, a raw air inlet, and a pure air outlet;
   a filter element arranged exchangeably in the filter housing and, therein, separating a raw side which is connected fluidically to the raw air inlet from a pure side which is connected fluidically to the pure air outlet;
   the filter element including an annular filter body composed of a filter material, a first end plate disposed on a first axial end side of the filter body, and a second end plate disposed on a second axial end side of the filter body;
   a dust collector space disposed in the filter housing on the raw side;

the dust collector space delimited axially on one side directly by the housing lid;

the dust collector space delimited axially on an other side directly by the first end plate;

the housing lid having, on an inner side, a step which radially delimits the dust collector space and borders the dust collector space in a C-shaped manner in a circumferential direction;

a connection configured in a circumferential section of the dust collector space which is not bordered by the step, the connection open radially toward the dust collector space and axially toward an annular space of the raw side which encloses the filter body in the circumferential direction;

a discharge stub arranged on the filter housing fluidically connecting the dust collector space to a surrounding area of the air filter;

wherein the step has a radial aperture fluidically connecting the dust collector space to the discharge stub;

wherein the discharge stub includes a main connecting opening defined by the radial aperture of the step which opens toward the annular space, and an auxiliary connecting opening which opens toward the dust collector space.

17. The air filter as claimed in claim 16, wherein:

the main connecting opening opens into the annular space fluidically connecting the discharge stub and the annular space; and the auxiliary connecting opening opens into the dust collector space fluidically connecting the discharge stub and the dust collector space.

18. The air filter as claimed in claim 16, wherein the raw air inlet is disposed on the housing pot distally with respect to the housing lid such that, during operation of the air filter, fresh air enters tangentially into the annular space.

19. The air filter as claimed in claim 16, wherein the pure air outlet is arranged on a pot bottom of the housing pot disposed axially opposite the housing lid such that, during operation of the air filter, fresh air exits axially through the pure air outlet from an interior space of the filter element, the interior space enclosed in the circumferential direction by the filter body.

20. The air filter as claimed in claim 16, wherein:

the discharge stub is configured as a suction jet pump including a propellant inlet, an operating medium inlet, and a mixture outlet;

the main connecting opening defines the propellant inlet;

the auxiliary connecting opening defines the operating medium inlet; and the mixture outlet is defined by an outlet opening of the discharge stub connected fluidically to the surrounding area.

* * * * *